Patented Feb. 8, 1927.

1,616,739

UNITED STATES PATENT OFFICE.

WILLIAM D. BOST, OF CHICAGO, ILLINOIS, ASSIGNOR TO ORANGE CRUSH COMPANY, OF CHICAGO, ILLINOIS, A CORPORATION OF ILLINOIS.

FOOD-COLORING COMPOSITION AND METHOD OF PREPARING SAME.

No Drawing.   Application filed July 18, 1921.   Serial No. 485,654.

This invention relates generally to food colors and to improvements in the art of preparing them. It pertains more particularly to a new composition of matter constituting an artificial coloring for orange drinks or imitation orange drinks or beverages, and to the method of making such a coloring composition.

As is well known in the trade, there are various kinds of so-called orange drinks or beverages which include as their constituents orange juice, oil of orange, and other flavoring materials of acid nature. Such drinks are prepared, in some instances, in concentrate form for admixture with diluting liquids such as simple sirup and carbonated water at the time of dispensing or bottling, and in other instances are prepared in potable form and bottled. Experience has proved that, in order to meet merchandizing requirements, such drinks must be colored in order to give them the attractive orange tint, the flavoring constituents of the beverage not possessing the desired tinctorial values. Certain aniline dyes are satisfactory for this purpose, but their use is barred in many jurisdictions by food laws or regulations. Vegetable coloring materials, on the other hand, are at present universally allowable under food regulations, but heretofore no satisfactory vegetable coloring material answering the special requirements of an orange drink has been devised.

The general purpose of the present invention is the provision of a new composition of matter constituting a coloring material of vegetable nature which will form a satisfactory coloring for so-called orange drinks.

A more specific purpose of the invention is the provision of such a composition of matter which will give mixtures the proper orange color when it is combined with the flavoring and diluting materials, and which will not precipitate or separate out of the drink, or cause it to become cloudy, either when bottled or when standing exposed to air.

Another particular object of the invention is the provision of a coloring matter which will not undesirably affect the taste or odor of the drink, either when fresh or when bottled or after exposure to atmosphere.

Another particular object of the invention is the provision of such a composition which may be utilized effectively in the concentrate, or which may be added directly to the drink after dilution.

A further object is the provision of such a composition which may be manufactured and sold economically, which is effective in very small quantities, and which is entirely harmless when utilized in the intended fashion.

A further object of the invention is an improved method of making such a coloring matter.

Other and further objects of the invention will be pointed out hereinafter, indicated in the appended claims, or obvious to one skilled in the art upon consideration of the present disclosure.

For the purpose of explaining the invention I shall describe one combination of ingredients which will produce the desired composition of matter, and one manner in which the composition may be prepared, but it is to be understood that the invention is not limited to the exact particulars of this purely illustrative disclosure. For illustration, my improved coloring material may be prepared as follows: To 60 pounds of glycerin add 10 pounds of a good commercial grade of carmine, heat the mixture gently and stir constantly until a homogeneous mixture results. While the mixture is still hot, add two pounds of caustic soda (NaOH) dissolved in one gallon of water and stir for a short time and then raise the temperature of the mixture to a point between 212° F. and the boiling point of glycerin which is 554° F. With the mixture at this temperature, add 5 pounds of concentrated ammonium hydroxide ($NH_4OH$) and boil for ten minutes to remove a part of the water present and to completely dissolve the carmine in the alkaline glycerin. This has the effect of intensifying the color of the mixture. While the mixture is boiling add 4 pounds of 85% phosphoric acid ($H_3PO_4$), and continue the boiling for approximately ten minutes more to complete the chemical reaction. The resulting solution is slightly acid, and while of high tinctorial value, is red, but when combined with a flavoring material of the sorts commonly employed in orange drinks, and which is of a degree of acidity suitable for commercial use, the composition undergoes a color change from red to orange which is effective to give the diluted potable mixture the desired orange tint.

The coloring composition itself may be diluted with a sugar solution no less concentrated than 25° B. in the proportion of one to twenty, with which dilution it may be added directly to the drink itself or diluted with water. The preliminary dilution of the sugar solution may be effected in the preparation of the concentrate or syrup from which the potable drink subsequently is to be made, and which concentrate or syrup is made by mixing the coloring composition with sugar solution and the drink flavoring material. The coloring material should not be added directly to the drink or diluted with water without such preliminary dilution with a sugar solution, as under such circumstances it will precipitate. The coloring material may be employed in any quantity necessary to give the desired orange color. A concentrate or a drink containing this coloring composition may be kept indefinitely without deterioration in any way from the effects of the coloring material, as drinks in which it is utilized will develop no undesirable taste or odor from the same, nor will their flavor or appearance be undesirably affected. The composition furthermore meets all other requirements of a vegetable coloring material for orange and imitation orange beverages.

It is to be understood that the invention is to be construed to cover the use of other ingredients in substitution for those specified in the illustrative example, such as the substitution of other non-injurious acids and alkalies as those specified and the use of other suitable food colors such as carminac acid instead of carmine.

I claim:

1. As a new composition of matter, a coloring compound for potable liquids comprising a combination of carmine and glycerin with salts formed by the interaction of hydroxides of sodium and ammonium with phosphoric acid.

2. As a new composition of matter a coloring compound for potable mixtures comprising a solution containing the reaction products of ten parts (by weight) of carmine and two parts of caustic soda in sixty parts of glycerin with an addition of five parts of ammonium hydroxide and four parts of phosphoric acid.

3. A method of producing a coloring material for orange drinks and the like which consists in dissolving carmine in alkaline glycerin and counteracting the alkalinity by addition of a potable acid.

4. A method of producing a coloring material for orange drinks and the like which consists in dissolving carmine in alkaline glycerin, counteracting the alkalinity by addition of a potable acid, and diluting with sugar solution.

5. A method of producing a coloring material for potable mixtures of orange tint which consists in dissolving carmine in alkaline glycerin, counteracting the alkalinity by addition of a potable acid, and diluting with sugar solution of not less than 25° B.

6. A method of making vegetable coloring compound for orange drinks, which consists in mixing carmine with glycerin, adding a strong alkali and boiling, then adding a weaker alkali and boiling, and finally counteracting the alkalinity of the mixture and boiling.

7. A method of preparing a coloring material for contributing an orange tint to potable mixtures, which consists in mixing ten parts (by weight) of carmine coloring material with sixty parts of hot glycerin, adding to the hot mixture two parts of caustic soda dissolved in water, concentrating to remove water, adding five parts of concentrated ammonium hydroxide and boiling, and then adding four parts of 85% phosphoric acid and boiling.

8. A method of preparing a coloring material for contributing an orange tint to potable mixtures, which consists in mixing ten parts (by weight) of carmine coloring material with sixty parts of hot glycerin, adding to the hot mixture two parts of caustic soda dissolved in water, concentrating to remove water, adding five parts of concentrated ammonium hydroxide and boiling, then adding four parts of 85% phosphoric acid and boiling, and finally diluting with sugar solution of not less than 25° B.

9. A method of producing a coloring material for potable mixtures, which consists in dissolving carmine coloring matter in alkaline glycerin, intensifying the color value of the solution by addition of ammonium hydroxide, counteracting the alkalinity of the mixture to a point rendering it slightly acid and then diluting with sugar solution of not less than 25° B.

In testimony whereof I have hereunto signed my name.

WILLIAM D. BOST.